June 8, 1943.  W. F. CARR ET AL  2,321,457
APPARATUS FOR THE TREATMENT OF ACID SLUDGE
Filed Sept. 28, 1938
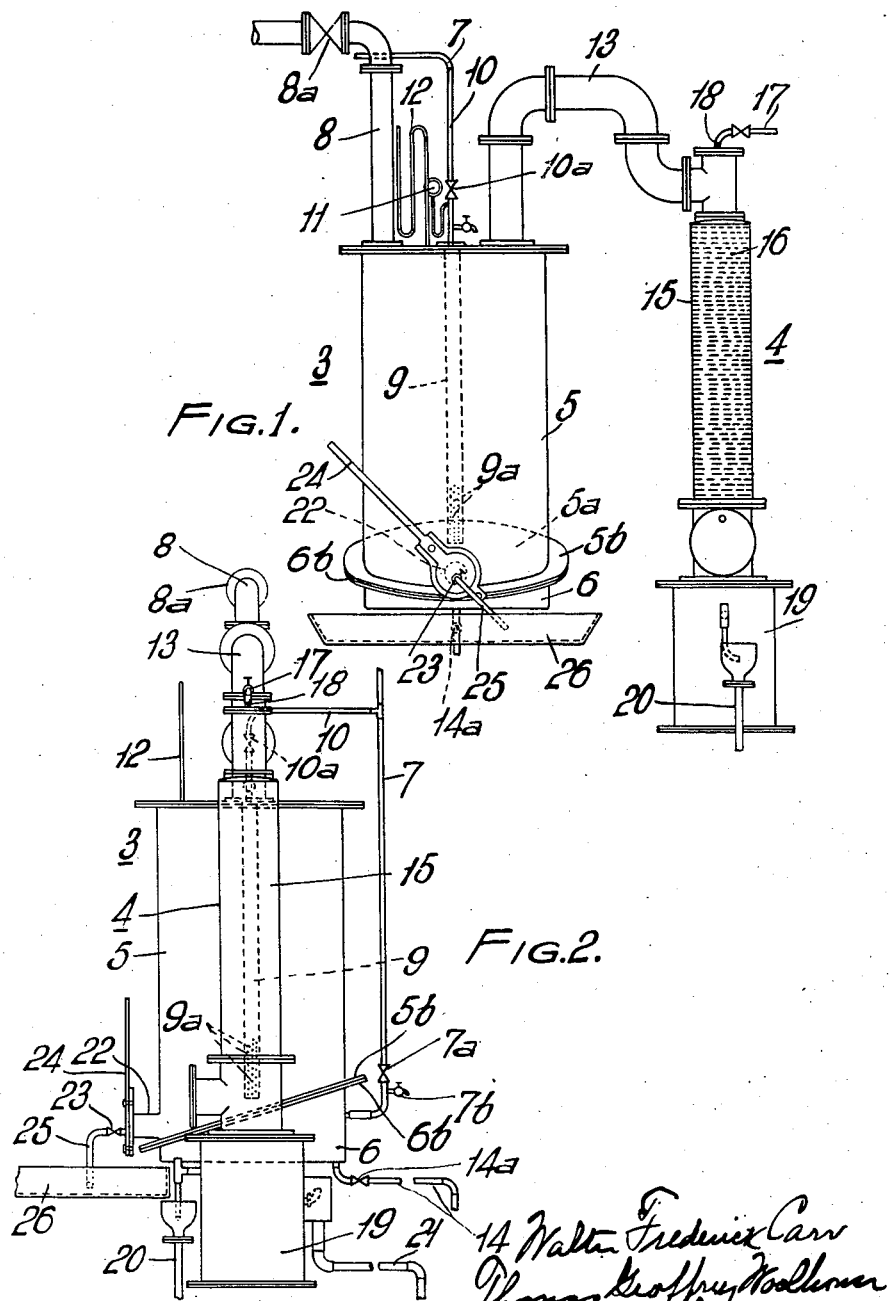

Patented June 8, 1943

2,321,457

UNITED STATES PATENT OFFICE 2,321,457

APPARATUS FOR THE TREATMENT OF ACID SLUDGE

Walter Frederick Carr, Thomas Geoffrey Woolhouse, and William Green, Wath-upon-Dearne, near Rotherham, England Application September 28, 1938, Serial No. 232,116 In Great Britain October 4, 1937

2 Claims. (Cl. 23—285)

This invention relates to the treatment of acid sludge from the refining of spirit recovered from the carbonisation of coal, hereinafter termed "benzol refining," and has for its main object to provide an improved method and apparatus by which hydrocarbons and dilute acid are recovered from the acid sludge and the escape of noxious fumes to atmosphere may be entirely prevented.

The invention comprises a method and apparatus for the treatment of acid sludge from benzol refining in which the acid sludge is steam treated in a treatment vessel to remove the desired hydrocarbons together with sulphurous and water vapours, the remaining contents of the treatment vessel being maintained at elevated temperature to enable the separation of the resin and acid liquor into layers, the layers being run off separately with the resin still in the liquid state.

The invention is more particularly concerned with the treatment of acid sludge obtained during benzol refining and one method of and plant for carrying the invention into effect in connection with such refining will now be described, by way of example, with reference to the accompanying drawing in which:

Figure 1 is a front elevation of an acid sludge treatment plant constructed in accordance with the invention, and Figure 2 is a side elevation of the plant shown in Figure 1.

The plant consists mainly of a cylindrical steel shell 3 acting as a treatment vessel for the acid sludge and a scrubber condenser 4 connected therewith. The sludge, together with a suitable quantity of cold water, is run off from the benzol washer into the treatment vessel 5 forming the upper part of the steel shell 3 which also comprises a heating chamber 6 in the form of a steam chest at its base. Low pressure steam is admitted to the heating chamber 6 through a pipe 7, provided with a stop valve 7a and tap 7b, in order to heat up the treatment vessel 5 prior to the admission of acid sludge to the latter, the steam passing from the chamber 6 through an outlet 14 provided with a valve 14a. The sludge is admitted to the treatment vessel by opening a valve 8a in a pipe 8 connecting the treatment vessel with the benzol washer, and when the sludge has been run in low pressure steam from the pipe 7 is admitted to the treatment vessel through an internal cracker pipe 9 disposed vertically in the treatment vessel. The steam passes from the pipe 7 by way of a branch 10 provided with a stop valve 10a which is opened to admit the steam to the upper end of the cracker pipe 9, the perforated part 9a of which is immersed in the sludge. Pressure gauges 11 and 12 are provided on the pipe 10 and treatment vessel 5 respectively.

The benzol, water vapour and sulphurous fumes generated during steaming are conducted from the top of the treatment vessel by a swan neck 13 to the scrubber condenser 4. The upper part of the latter consists of a column 15 packed with Raschig rings 16 or other suitable packing, water being fed to the upper end of the column by a valved pipe 17 through a spray 18. The water condenses the benzol and water vapour and dissolves the acid fumes and the mixture of water and benzol is run from the base of the scrubber condenser into a separator 19 where the benzol is recovered and passed to a calibrated storage through a pipe 20 while the water is run to waste through a pipe 21. The water fed to the scrubber condenser through the pipe 17 has an alkaline reaction, the alkalinity being so arranged as to absorb any acid vapours produced in the distillation process, the waste water being neutral, or substantially neutral.

The operation of the process is carefully controlled insofar that the minimum of free steam, that is the low pressure steam admitted to the treatment vessel 5 through the internal cracker pipe 9, is used consistent with the complete elimination of benzol from the sludge and the production of a fluid resin. As soon as benzol ceases to run from the separator, the treatment is discontinued by closing valve 10a to cut off the open steam. The contents of the treatment vessel are then allowed to stand for approximately fifteen minutes with continued admission of confined steam to the heating chamber 6 to allow of separation into an upper layer of liquid resin and a lower layer of acid liquor, the temperature of this final heating stage of the sludge being that which will result from the use of live steam at a pressure not to exceed ten pounds per square inch. The treatment vessel is provided with a sloping bottom 5a which is extended peripherally to form an inclined flange 5b bolted to a corresponding flange 6b formed on the heating chamber 6. The sloping bottom 5a facilitates the separation of the layers in that it slopes downwardly to run-off means 22 comprising a small cock 23 and a main valve 24. The lower layer of acid liquor is first run off through the small cock and pipe 25, and when this operation is complete the main valve 24 is opened and the thick liquid resin is run off to a cooling tray 26. Within three hours the resin has set and may easily be broken up and removed.

By means of the method and apparatus described it will be seen the resin is separated in a liquid state without the addition of tar or oil. Moreover, the products obtained from the treatment of the sludge, that is light oils, acid and resinous residues are removed from the apparatus by gravity, no manual labour being involved in the process. The cold water addition to the sludge is sufficient to maintain a requisite acid concentration and the quantity will be varied according to the condition of the sludge. The steam pressure required for the operation of the plant, that is to say for both the free and the confined steam treatment, does not exceed ten pounds per square inch.

What we claim and desire to secure by Letters Patent is:

1. An apparatus for the practice of the herein described method, embodying therein a treatment vessel, means for delivering a fixed quantity of a mixture of sludge and water thereinto, heating means adjacent the bottom of said vessel, a cracker pipe extending into, and having outlets adjacent the bottom of, said vessel, whereby low pressure steam may be delivered into the sludge mixture adjacent the bottom of said vessel, means controlling the steam supply for said cracker pipe, means comprising a small valve controlled pipe for withdrawing acid liquor from the bottom of said vessel, and means comprising a gate controlled main valve for withdrawing fluid resin from the bottom of said vessel.

2. An apparatus for the practice of the herein described method, embodying therein a treatment vessel having a sloping bottom, means for delivering a mixture of sludge and water thereinto, steam heating means below the bottom of said vessel, a cracker pipe extending into, and having outlets adjacent the bottom of, said vessel, whereby low pressure steam may be delivered into the sludge mixture adjacent the bottom of said vessel, means controlling the steam supply for said cracker pipe, means comprising a small valve controlled pipe at the foot of the slope at the bottom of said vessel for withdrawing acid liquor from the bottom of said vessel, and means comprising a gate controlled main valve at the foot of the slope at the bottom of said vessel for withdrawing fluid resin from the bottom of said vessel.

WALTER FREDERICK CARR.
THOMAS GEOFFREY WOOLHOUSE.
WILLIAM GREEN.